United States Patent
Karlsson et al.

(10) Patent No.: US 11,161,430 B2
(45) Date of Patent: Nov. 2, 2021

(54) VEHICLE OCCUPANT POSTURE DETECTION

(71) Applicant: Volvo Car Corporation, Gothenburg (SE)

(72) Inventors: Simon Karlsson, Älvängen (SE); Jörgen Lindberg, Uddevalla (SE)

(73) Assignee: Volvo Car Corporation, Gothenburg (SE)

( * ) Notice: Subject to any disclaimer, the term of this patent is extended or adjusted under 35 U.S.C. 154(b) by 401 days.

(21) Appl. No.: 16/269,634

(22) Filed: Feb. 7, 2019

(65) Prior Publication Data
US 2020/0254904 A1    Aug. 13, 2020

(51) Int. Cl.
| | |
|---|---|
| *B60N 2/02* | (2006.01) |
| *B60N 2/20* | (2006.01) |
| *B60Q 9/00* | (2006.01) |
| *G01B 21/22* | (2006.01) |

(52) U.S. Cl.
CPC ............. *B60N 2/0244* (2013.01); *B60N 2/20* (2013.01); *B60Q 9/00* (2013.01); *G01B 21/22* (2013.01); *B60N 2002/0272* (2013.01)

(58) Field of Classification Search
CPC .............. B60N 2/0244; B60N 2/20; B60N 2002/0272; B60N 2/22; B60N 2/18; B60N 2002/0268; B60N 2/0276; B60N 2/0224; B60Q 9/00; G01B 21/22; B60R 16/037
See application file for complete search history.

(56) References Cited

U.S. PATENT DOCUMENTS

| | | | | |
|---|---|---|---|---|
| 6,078,854 | A * | 6/2000 | Breed | B60N 2/002 701/49 |
| 6,081,757 | A * | 6/2000 | Breed | B60N 2/002 701/45 |
| 6,116,640 | A | 9/2000 | Tanaka et al. | |
| 6,466,849 | B2 | 10/2002 | Kamiji et al. | |
| 8,676,447 | B2 | 3/2014 | Togura et al. | |
| 9,110,112 | B2 | 8/2015 | Nakagawa | |
| 9,604,587 | B2 | 3/2017 | Togura et al. | |
| 9,738,179 | B2 * | 8/2017 | Ebina | B60W 50/082 |

(Continued)

FOREIGN PATENT DOCUMENTS

WO    2018008508 A1    1/2018

OTHER PUBLICATIONS

May 18, 2020 European Search Report issued on International Application No. 20155078.

*Primary Examiner* — Richard M Camby
(74) *Attorney, Agent, or Firm* — Clements Bernard Walker; Christopher L. Bernard

(57) ABSTRACT

A vehicle occupant posture detection (OPD) system, including: a measuring device coupled to a seat back of a seat of a vehicle and adapted to determine an angle ($\alpha$) between a Z-axis and a torso line of an occupant seated in the seat by measuring an angle of the seat back; a measuring device coupled to a seat bottom of the seat of the vehicle and adapted to determine an angle ($\beta$) between the Z-axis and a femoral line of the occupant seated in the seat by measuring an angle of the seat bottom; and means for receiving and using the determined values of $\alpha$ and $\beta$ to determine an angle ($\varphi$) between the torso line and the femoral line of the occupant seated in the seat and thereby characterize a posture state of the occupant seated in the seat.

21 Claims, 4 Drawing Sheets

(56) References Cited

U.S. PATENT DOCUMENTS

| | | |
|---|---|---|
| 10,085,570 B2 | 10/2018 | Bellam et al. |
| 10,140,533 B1 | 11/2018 | Chan et al. |
| 2006/0208549 A1* | 9/2006 | Hancock .............. B60N 2/0232 297/342 |
| 2009/0088930 A1 | 4/2009 | Ohtsubo et al. |
| 2009/0195039 A1 | 8/2009 | Fujita et al. |
| 2017/0355282 A1 | 12/2017 | Zouzal et al. |
| 2020/0130680 A1* | 4/2020 | Cho .................... B60N 2/0276 |

* cited by examiner

VEHICLE OCCUPANT POSTURE DETECTION

TECHNICAL FIELD

The present invention relates generally to the automotive field. More specifically, the present invention relates to vehicle occupant comfort, safety, and design features that utilize occupant posture detection (OPD).

BACKGROUND ART

Most conventional vehicles utilize seats that incorporate only a simple sensor to detect seat length/position, and potentially seat bottom height, by monitoring the degree of deployment of a stepper or rotational motor actuator that is used to adjust the seat bottom. For example, the number of turns on a rotational motor actuator that controls seat length/position or seat bottom height can be monitored. Likewise, HALL-sensors are often used to monitor the adjustment of seats equipped with a memory recall function, monitoring seat length/position, seat bottom height, seat tilt, seat back recline, etc. However, such HALL-sensors take relativistic measurements, not using the vehicle itself as a frame of reference. In general, seat (and occupant) position with respect to seat belts, air bags, and other safety devices is significantly important. One variable that affects such safety is occupant posture, which is controlled, in large part, by seat bottom length/position, seat bottom height, seat tilt angle, and seat back recline angle, as well as head rest height, in an absolute sense. These variables are typically not adequately monitored or utilized. For example, seat length/position is typically monitored only for air bag deployment purposes, with an on/off threshold being utilized to trigger different air bag behaviors for small vehicle occupants or the like. Thus, what are needed in the art are improved seat-related vehicle occupant comfort, safety, and design features.

SUMMARY

The advanced vehicle described herein utilizes seats that incorporate various sensors that are utilized to detect seat bottom length/position, seat bottom height, seat tilt angle, and seat back recline angle, as well as head rest height, in an absolute sense. Radar/Lidar sensors in the vehicle can be used for these same purposes. In a broad sense, this information is used to establish general seat position (including with respect to seat belts, air bags, and other safety systems), orientation, and configuration, which is used by a seat control algorithm to default to or suggest comfortable seat settings, or limit seat settings, as well as to pre-position a seat in a safe configuration in advance of an impending impact event. Seat settings that are determined to be comfortable and safe can also be used in subsequent seat design and placement within a vehicle. Fundamentally, such algorithms consider seat information, translated to occupant posture information. Numerous sensors are used to gather secondary, and ultimately primary information. What is truly important is occupant posture. This is especially true in driver assist (DA) and autonomous driving (AD) situations, in which vehicle occupants are afforded a greater degree of freedom to move when not encumbered with focused driving tasks.

The problems alluded to above are addressed herein by detecting and utilizing occupant posture information, translated from seat information. Thus, the vehicle occupant posture detection (OPD) system, method, and algorithm described herein provide enhanced occupant comfort and safety with an economical number of seat sensors. The occupant posture information obtained can be used by a seat control algorithm to default to or suggest comfortable seat settings, or limit seat settings, as well as to pre-position a seat in a safe configuration in advance of an impending impact event. Seat settings that are determined to be comfortable and safe can also be used in subsequent seat design and placement within a vehicle. Advantageously, the OPD system, method, and algorithm described herein gather and ultimately utilize primary (i.e., occupant posture), not secondary (i.e., simple seat configuration), information. The vehicle OPD system provided herein represents a standalone system for determining an utilizing absolute posture position, and can be utilized for dummy ramping, preventing submarining, design evaluation, etc. By combining posture information with vehicle speed, seat length/position, and SRS information, for example, the relative position of a vehicle occupant with respect to safety restraints and other systems is fully defined.

The vehicle occupant posture detection (OPD) system described herein generally includes: a measuring device coupled to a seat back of a seat of a vehicle and adapted to determine an angle ($\alpha$) between a Z-axis (e.g., absolute vehicle or with respect to gravity) and a torso line of an occupant seated in the seat by measuring an angle of the seat back; a measuring device coupled to a seat bottom of the seat of the vehicle and adapted to determine an angle ($\beta$) between the Z-axis and a femoral line of the occupant seated in the seat by measuring an angle of the seat bottom; and means for receiving and using the determined values of $\alpha$ and $\beta$ to determine an angle ($\varphi$) between the torso line and the femoral line of the occupant seated in the seat and thereby characterize a posture state of the occupant seated in the seat.

The vehicle occupant posture detection (OPD) method described herein generally includes the steps of: determining an angle ($\alpha$) between a Z-axis (e.g., absolute vehicle or with respect to gravity) and a torso line of an occupant seated in a seat of a vehicle using a measuring device coupled to a seat back of the seat; determining an angle ($\beta$) between the Z-axis and a femoral line of the occupant seated in the seat using a measuring device coupled to a seat bottom of the seat; and using the determined values of $\alpha$ and $\beta$ to determine an angle ($\varphi$) between the torso line and the femoral line of the occupant seated in the seat and thereby characterize a posture state of the occupant seated in the seat.

The vehicle occupant posture detection (OPD) algorithm described herein generally includes a computer-readable medium storing computer-executable instructions configured to a vehicle occupant posture state, the computer-executable instructions being configured to cause the following computer-executed steps to occur: determining an angle ($\alpha$) between a Z-axis (e.g., absolute vehicle or with respect to gravity) and a torso line of an occupant seated in a seat of a vehicle using a measuring device coupled to a seat back of the seat; determining an angle ($\beta$) between the Z-axis and a femoral line of the occupant seated in the seat using a measuring device coupled to a seat bottom of the seat; and using the determined values of $\alpha$ and 1 to determine an angle ($\varphi$) between the torso line and the femoral line of the occupant seated in the seat and thereby characterize a posture state of the occupant seated in the seat.

As alluded to above, the OPD system, method, and algorithm described herein are preferably implemented in a vehicle, such as a traditional vehicle, a vehicle incorporating a DA system, or a vehicle incorporating an AD system.

BRIEF DESCRIPTION OF THE DRAWINGS

The present invention is illustrated and described herein with reference to the various drawings, in which like reference numbers are used to denote like system components/method or algorithm steps, as appropriate, and in which.

DESCRIPTION OF EMBODIMENTS

The vehicle occupant posture detection (OPD) system, method, and algorithm described herein ultimately detect and utilize occupant posture information, rather than simple seat information, and can be used in combination with other seat and vehicle sensors to provide both occupant posture and position in a vehicle such that safety and restraint systems can be fine-tuned. The OPD system, method, and algorithm thus provide enhanced occupant comfort and safety. The occupant posture information obtained can be used by a seat control algorithm to default to or suggest comfortable seat settings, or limit seat settings, as well as to pre-position a seat in a safe configuration in advance of an impending impact event (or warn an occupant of an unsafe configuration in advance). Seat settings that are determined to be comfortable and safe can also be used in subsequent seat design and placement within a vehicle. Advantageously, the OPD system, method, and algorithm described herein gather and utilize primary (i.e., absolute) posture information, translated from secondary (i.e., simple relativistic) seat information. This is especially useful in driver assist (DA) and autonomous driving (AD) situations, where simple seat information may not necessarily accurately correlate to occupant posture information.

Figure 1:
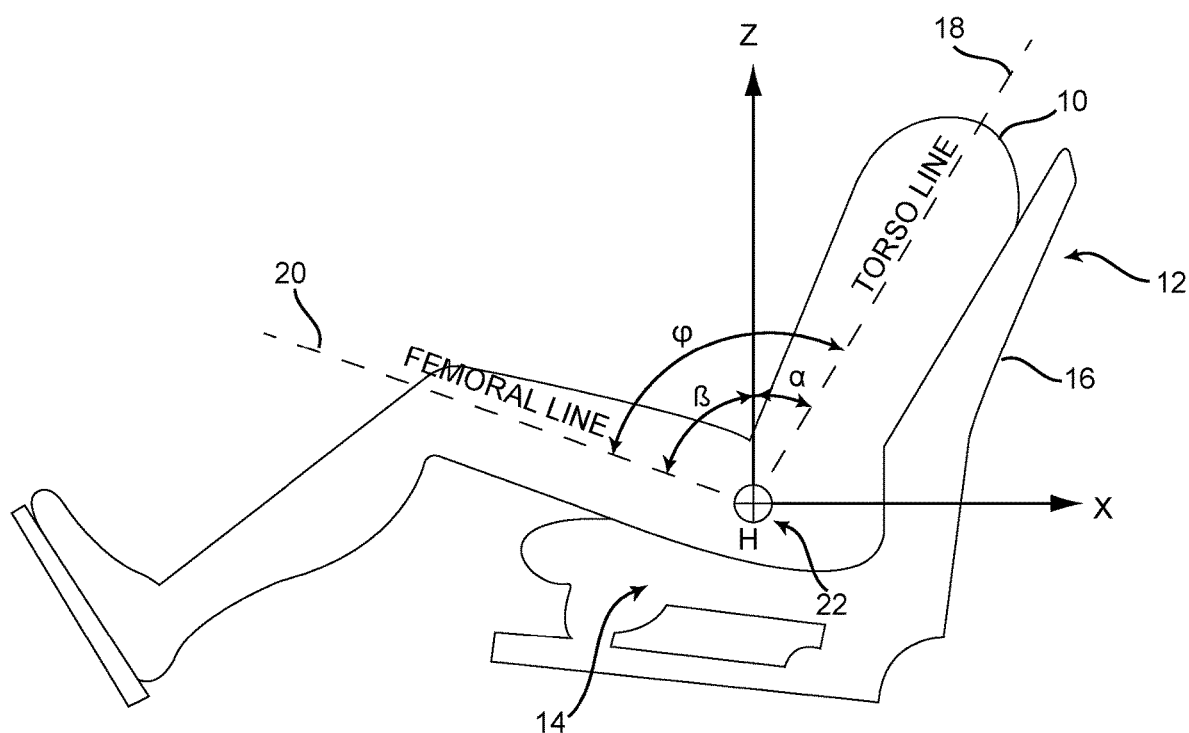
FIG. 1 is a schematic diagram illustrating the general occupant posture detection (OPD) concepts utilized by the system, method, and algorithm described herein.

Referring now specifically to FIG. 1, when a vehicle occupant 10 is seated in a vehicle seat 12 including a seat bottom 14 (i.e., a seat pan and/or cushion frame) and a seat back 16, the angle ($\varphi$) between the torso line 18 and the femoral line 20 of the occupant 10 in the Z-plane is an important indicator of occupant posture. Several inputs comprise $\varphi$, including the seat back recline adjustment position, the seat bottom frame height adjustment position, the seat bottom frame tilt adjustment position, and the seat angle to the ground plane. The knowledge of the angle between the Z-axis (e.g., absolute vehicle or with respect to gravity) and the torso line 18 ($\alpha$) and the angle between the Z-axis and the femoral line ($\beta$) independently define $\varphi$ and can be used to find the orientation of $\varphi$ in the XZ-plane. The knowledge of $\varphi$ provides information related to occupant posture and seat belt geometry properties at any H-point 22.

As $\alpha$, $\beta$, and $\varphi$ effectively fully characterize occupant posture in a manageable and efficient manner, the knowledge of $\alpha$, $\beta$, and $\varphi$ can be used to default to or suggest comfortable seat settings, or limit seat settings, as well as to pre-position a seat in a safe configuration in advance of an impending impact event (or avoid an unsafe configuration altogether). Further, seat settings that are determined to be comfortable and safe can also be used in subsequent seat design and placement within a vehicle. All of these advantages flow from a characterization of occupant posture, translated from simple seat position and configuration, and posture can be related to many other factors, such as DA/AD enabling/disabling, ensuring adequate operator vision, ensuring ingress/egress access, etc.

Figure 2:
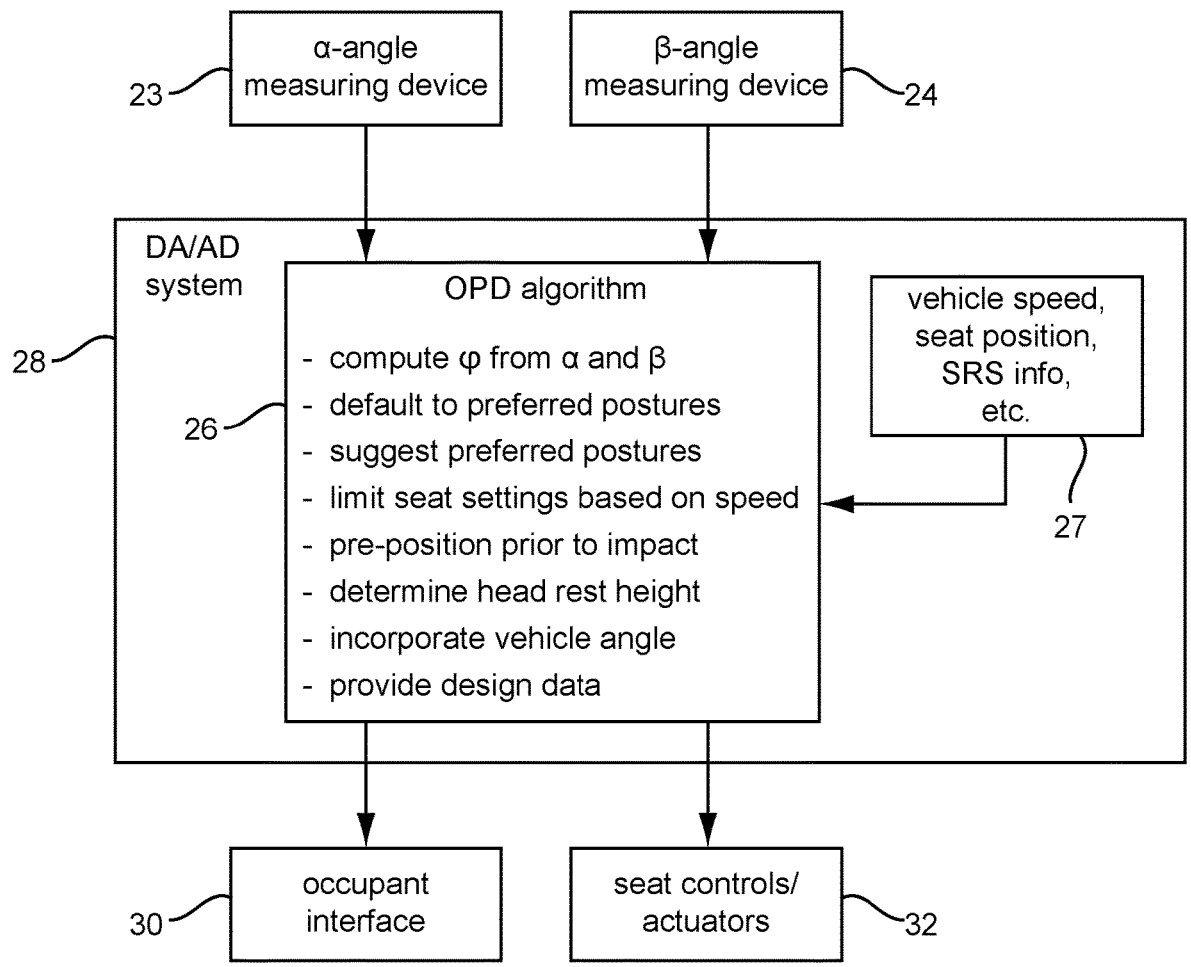
FIG. 2 is a schematic diagram illustrating one exemplary embodiment of the OPD system described herein.

Referring now specifically to FIG. 2, using $\alpha$, $\beta$, and $\varphi$ to fully characterize occupant posture, one angle measuring device 23, such as an electromechanical sensor, camera, or the like, is incorporated in the seat back 16 to measure $\alpha$, and one angle measuring device 24, such as an electromechanical sensor, camera, or the like, is incorporated in the seat bottom 14 (i.e., the seat pan and/or cushion frame) to measure $\beta$. An OPD algorithm 26 then translates these two measurements into $\varphi$ to characterize and utilize occupant posture, providing various comfort and safety information and dictating various control actions. It should be noted that the electromechanical sensors, cameras, and the like utilized herein are well known to those of ordinary skill in the art. Thus, they are not described in greater detail herein. It should also be noted that, advantageously, the OPD system, method, and algorithm described herein utilizes two or more meaningful inputs, as opposed to the conventional one input (i.e., simple relativistic seat length/position and configuration information). This promotes measurement simplicity and cost efficiency, while providing greater utility.

The OPD algorithm 26, which preferably forms part of a broader DA or AD system 28, uses $\alpha$, $\beta$, and/or $\varphi$ to generally characterize pelvic and iliac crest position, both of which are important to characterizing occupant posture and ensuring occupant comfort and safety. For example, the iliac crest is the main load path for the lower part of a conventional 3-point seat belt—hence a key contributor to the occupant restraint level upon the occurrence of an impact event. The OPD algorithm 26 also uses $\alpha$, $\beta$, and/or $\varphi$ to default to or suggest comfortable seat settings. For example, one or more suggested seat pre-sets can be provided to the occupant 10 via a conventional or novel occupant interface 30, each of which suggested seat pre-sets provides a comfortable seating configuration that promotes both comfort and good posture. Each of these suggested seat pre-sets can modify seat bottom length/position, seat bottom height, seat tilt angle, and seat back recline angle, as well as seat position and head rest height in a concerted manner, via one or more conventional or novel seat adjustment controls 32. In combination with conventional vehicle speed, seat position, and SRS information 27 and the like, the OPD algorithm 26 can also use $\alpha$, $\beta$, and/or $\varphi$ to limit the adjustment range of the seat 12, to assure that the seat 12 remains in a preferred posture position/configuration prior to an upon the occurrence of an impact event, especially with respect to the seat belts, air bags, and other safety systems of the vehicle. This limiting function can thus incorporate linear seat position/height determination and can be speed dependent, for example, discriminating between preferred stationary-vehicle postures and preferred high-speed-vehicle postures. An occupant alert can also be provided via the conventional or novel occupant interface 30 that informs the occupant of whether or not he or she has chosen a seating configuration that promotes good posture, and therefore comfort and safety. The OPD algorithm 26 also uses $\alpha$, $\beta$, and/or $\varphi$ to pre-position a seat in a safe configuration in advance of an impending impact event. Good posture upon impact helps to prevent injury. In this manner, the OPD algorithm 26 helps prepare an occupant for an impending impact event. Disfavored seat configurations outside of OEM recommendations can be disallowed, or an appropriate occupant alert can be provided. Further, seat settings that are determined to be comfortable and safe, providing optimal occupant posture, can also be used in subsequent seat design and placement within a vehicle, based on determined optimal α, β, and/or φ ranges. All of these functionalities of the OPD algorithm 26 flow from a characterization of occupant posture, translated from simple seat position and configuration.

In addition to the above, current head rest height can be determined from α and a knowledge of seat back height. Head rest height can then be kept within certain specified safety ranges, either generally or in anticipation of an impact event. This effectively helps to prevent whiplash injuries, in which head rest positioning plays an important role.

It should also be noted that the determination of φ can be further refined with input related to overall vehicle angle, i.e., ground plane, angle, which is typically monitored in newer vehicles. Overall vehicle angle effectively orients the torso line 18 and femoral line 20.

Preferably, the OPD algorithm 26 described herein is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, sensors, etc., as described herein.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Figure 3:
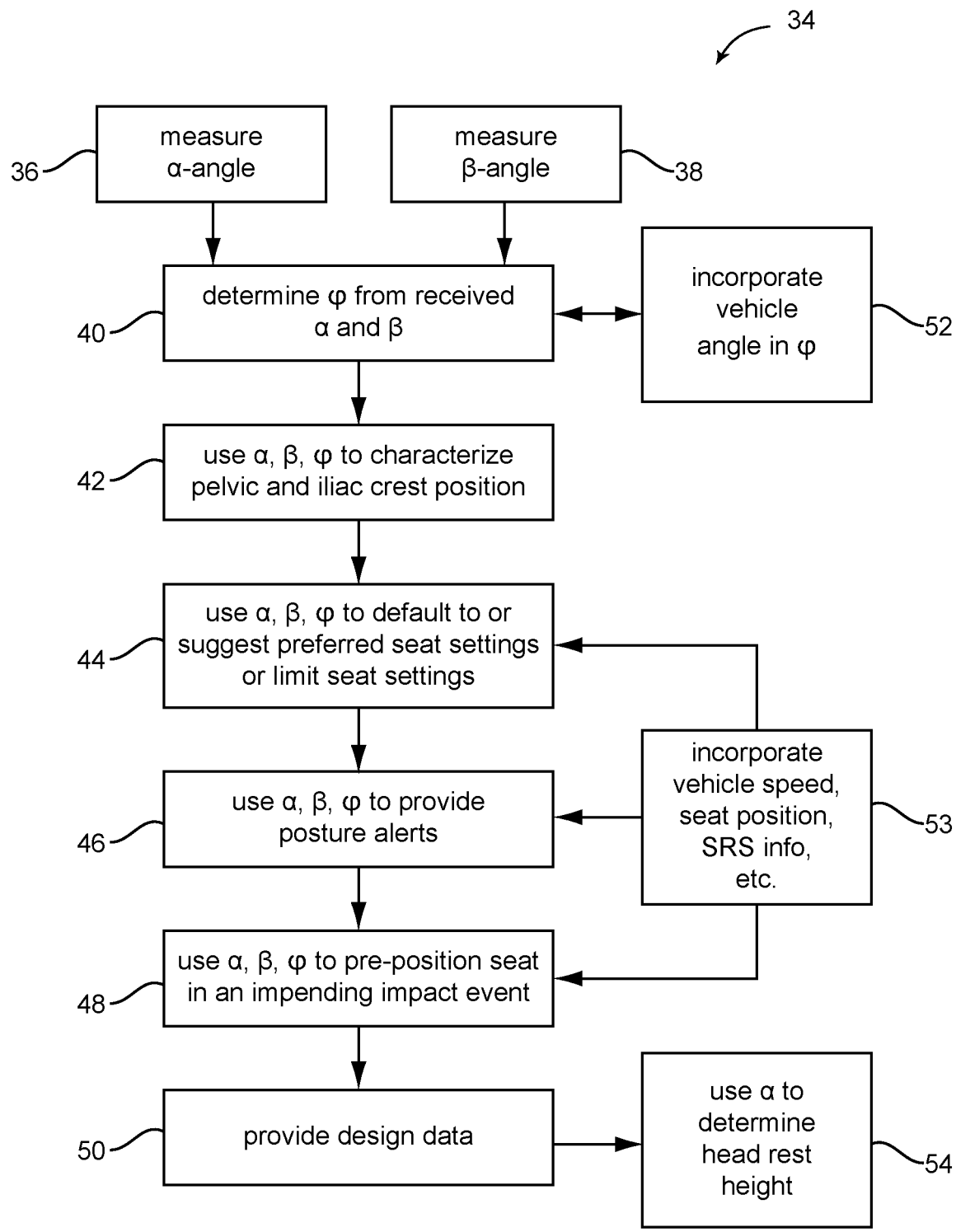
FIG. 3 is a schematic diagram illustrating one exemplary embodiment of the OPD method or algorithm described herein.

Referring now specifically to FIG. 3, the method 34 provided herein, implemented by the OPD algorithm 26, uses α, β, and/or φ to fully characterize occupant posture. The angle α is received from the one angle measuring device 23, such as the electromechanical sensor, camera, or the like, incorporated in the seat back 16 (step 36), and the angle β is received from the one angle measuring device 24, such as the electromechanical sensor, camera, or the like, incorporated in the bottom 14 (i.e., the seat pan and/or cushion frame) (step 38). These two measurements are then translated into φ to characterize and utilize occupant posture (step 40), providing various comfort and safety information and dictating various control actions. It should again be noted that the electromechanical sensors, cameras, and the like utilized herein are well known to those of ordinary skill in the art. Thus, they are not described in greater detail herein. It should also again be noted that, advantageously, the OPD system, method, and algorithm described herein utilizes two or more inputs, as opposed to the conventional one input (i.e., simple relativistic seat length/position and configuration information). This promotes measurement simplicity and cost efficiency, while providing enhanced utility.

The method 34 then, optionally, includes using α, β, and/or φ to generally characterize pelvic and iliac crest position (step 42), both of which are important to characterizing occupant posture and ensuring occupant comfort and safety. The method 34 also includes using α, β, and/or φ to default to or suggest comfortable seat settings (step 44). For example, one or more suggested seat pre-sets can be provided to the occupant 10 via the conventional or novel occupant interface 30, each of which suggested seat pre-sets provides a comfortable seating configuration that promotes both comfort and good posture. Each of these suggested seat pre-sets can modify seat bottom length/position, seat bottom height, seat tilt angle, and seat back recline angle, as well as seat position and head rest height in a concerted manner, via the one or more conventional or novel seat adjustment controls 32. In combination with conventional vehicle speed, seat position, and SRS information (step 53) and the like, the method 34 can also include using α, β, and/or φ to limit the adjustment range of the seat 12, to assure that the seat 12 remains in a preferred posture position/configuration upon the occurrence of an impact event, especially with respect to the seat belts, air bags, and other safety systems of the vehicle (step 44). This limiting method can thus incorporate linear seat position/height determination and can be speed dependent, for example, discriminating between preferred stationary-vehicle postures and preferred high-speed-vehicle postures. The method 34 can further include providing an occupant alert via the conventional or novel occupant interface 30 that informs the occupant of whether or not he or she has chosen a seating configuration that promotes good posture, and therefore comfort and safety (step 46). The method 34 further includes using α, β, and/or φ to pre-position the seat in a safe configuration in advance of an impending impact event (step 48). Again, good posture upon impact helps to prevent injury. In this manner, the method 34 helps prepare an occupant for an impending impact event. Disfavored seat configurations outside of OEM recommendations can be disallowed, or an appropriate occupant alert can be provided. Further, seat settings that are determined to be comfortable and safe, providing optimal occupant posture, can also be used in subsequent seat design and placement within a vehicle, based on determined optimal α, β, and/or φ ranges (step 50). All of these functionalities of the method 34 flow from a characterization of occupant posture, translated from simple seat position and configuration.

In addition to the above, current head rest height can be determined from α and a knowledge of seat back height (step 52). Head rest height can then be kept within certain specified safety ranges, either generally or in anticipation of an impact event. This effectively helps to prevent whiplash injuries, in which head rest positioning plays an important role.

It should also be noted that the determination of φ can be further refined with input related to overall vehicle angle, i.e., ground plane, angle, which is typically monitored in newer vehicles (step 54).

Figure 4:
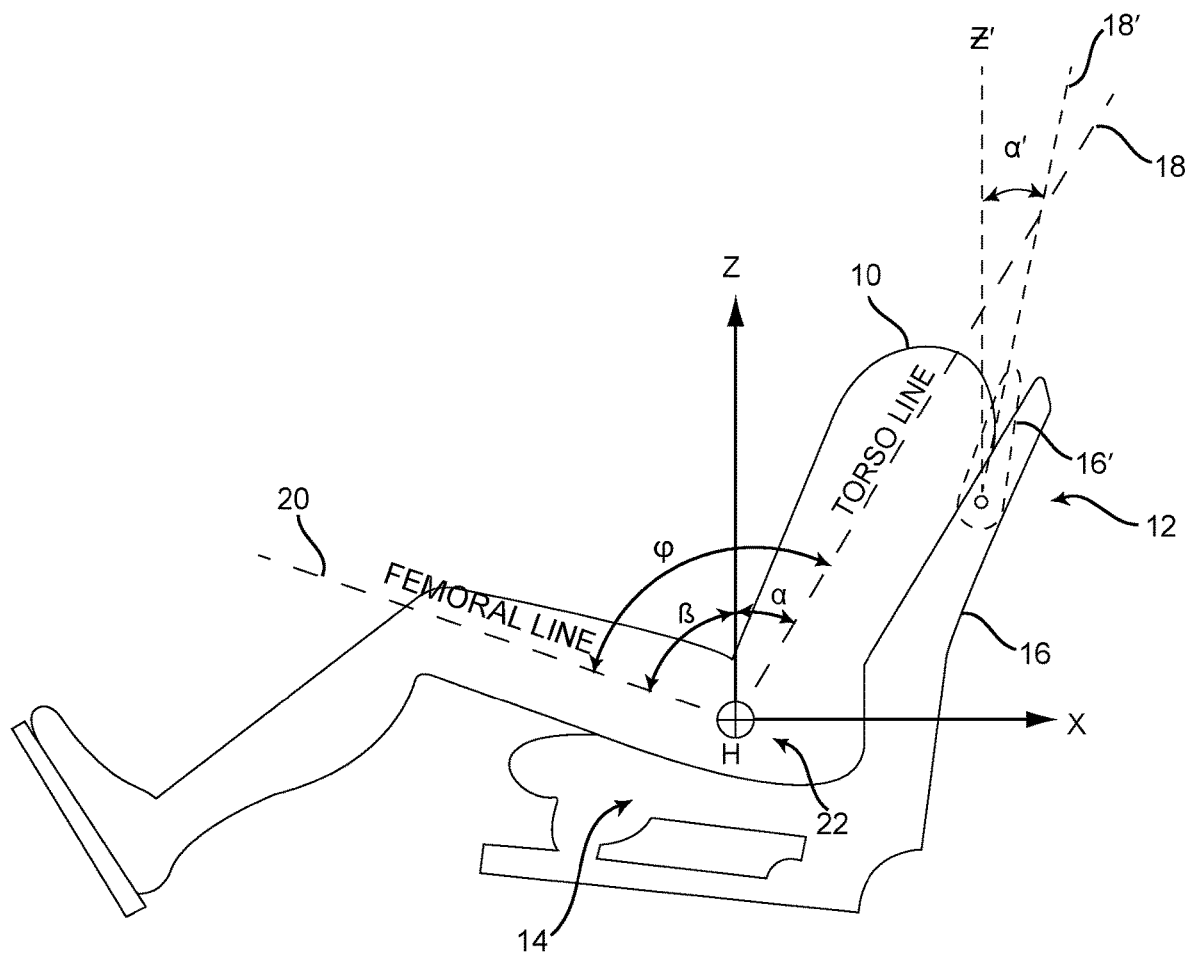
FIG. 4 is a schematic diagram illustrating further general OPD concepts utilized by the system, method, and algorithm described herein.

Referring now specifically to FIG. 4, in an extension of the above concepts, a two-pivot seat 12 is used, including a lower seat back 16 and an upper seat back 16' that can pivot with respect to one another. In this case, φ is a combination of 1 and a and α', where α' is the angle between the Z'-axis and the centerline 18' of the upper seat back 16'. The angle α' thus represents the forward pitch of the occupant's shoulders and head with respect to the occupant's lower back. This posture information is significant when considering occupant position in the event of an air bag deployment that impacts the occupant's face. It is especially relevant to the calculation of head rest height and, ultimately, an occupant's head.

Thus, the vehicle OPD system, method, and algorithm described herein ultimately detect and utilize occupant posture information, α, α', β, and/or φ, rather than simple seat information and can be used in combination with other seat and vehicle sensors to provide both occupant posture and position in a vehicle such that safety and restraint systems can be fine-tuned. The OPD system, method, and algorithm thus provide enhanced occupant comfort and safety. The occupant posture information obtained can be used by a seat control algorithm to default to or suggest comfortable seat settings, or limit seat settings, as well as to pre-position a seat in a safe configuration in advance of an impending impact event (or warn an occupant of an unsafe configuration in advance). Seat settings that are determined to be comfortable and safe can also be used in subsequent seat design and placement within a vehicle. Advantageously, the OPD system, method, and algorithm described herein gather and utilize primary (i.e., absolute) posture information, translated from secondary (i.e., simple relativistic) seat information. This is especially useful in driver assist (DA) and autonomous driving (AD) situations, where simple seat information may not necessarily accurately correlate to occupant posture information.

Data collected via the vehicle OPD system, method, and algorithm described herein can be used by a vehicle central safety computer (e.g., SRS) and air bags and the like can be modified/tuned in accordance with the collected data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Again, by way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Again, instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A vehicle occupant posture detection (OPD) system, comprising:
   a measuring device coupled to a seat back of a seat of a vehicle and adapted to determine an angle ($\alpha$) between a Z-axis and a torso line of an occupant seated in the seat by measuring an angle of the seat back;
   a measuring device coupled to a seat bottom of the seat of the vehicle and adapted to determine an angle ($\beta$) between the Z-axis and a femoral line of the occupant seated in the seat by measuring an angle of the seat bottom; and
   means for receiving and using the determined values of $\alpha$ and $\beta$ to determine an angle ($\varphi$) between the torso line and the femoral line of the occupant seated in the seat and thereby characterize a posture state of the occupant seated in the seat.

2. The system of claim 1, wherein the means for receiving and using the determined values of $\alpha$ and $\beta$ to determine $\varphi$ between the torso line and the femoral line of the occupant seated in the seat and thereby characterize the posture state of the occupant seated in the seat further comprises means for receiving and using the determined values of $\alpha$, $\beta$, and an angle of the vehicle relative to a ground plane to determine an oriented angle ($\varphi$) between the torso line and the femoral line of the occupant seated in the seat and thereby characterize the posture state of the occupant seated in the seat.

3. The system of claim 1, further comprising a seat control mechanism coupled to the means for determining $\varphi$ adapted to move the seat to a preferred posture configuration based on the determined value of one or more of a $\alpha$, $\beta$, $\varphi$, a sensed relative seat position, a sensed relative seat configuration, a sensed vehicle speed, and a safety restraint configuration.

4. The system of claim 1, further comprising a seat control mechanism coupled to the means for determining $\varphi$ adapted to limit the seat to a preferred posture configuration range of adjustment based on the determined value of one or more of a $\alpha$, $\beta$, $\varphi$, a sensed relative seat position, a sensed relative seat configuration, a sensed vehicle speed, and a safety restraint configuration.

5. The system of claim 1, further comprising an occupant interface coupled to the means for determining $\varphi$ adapted to suggest a preferred posture configuration for the seat based on the determined value of one or more of a $\alpha$, $\beta$, $\varphi$, a sensed relative seat position, a sensed relative seat configuration, a sensed vehicle speed, and a safety restraint configuration.

6. The system of claim 1, further comprising an occupant interface coupled to the means for determining $\varphi$ adapted to alert the occupant to whether the seat is in a preferred or disfavored posture configuration for the seat based on the determined value of one or more of a $\alpha$, $\beta$, $\varphi$, a sensed relative seat position, a sensed relative seat configuration, a sensed vehicle speed, and a safety restraint configuration.

7. The system of claim 1, further comprising a seat control mechanism coupled to the means for determining $\varphi$ adapted to move the seat to a preferred posture configuration based on the determined value of one or more of a $\alpha$, $\beta$, $\varphi$, a sensed relative seat position, a sensed relative seat configuration, a sensed vehicle speed, and a safety restraint configuration in the event that an impending impact event is detected.

8. The system of claim 1, further comprising means for receiving and using the measured value of a to determine a height of a head rest of the seat.

9. The system of claim 1, where the seat back includes a lower seat back and an upper seat back that are configured to pivot with respect to one another, and wherein the means for receiving and using the determined values of $\alpha$ and $\beta$ to determine $\varphi$ between the torso line and the femoral line of the occupant seated in the seat and thereby characterize the posture state of the occupant seated in the seat further comprises means for receiving and using the determined values of a $\alpha$, $\beta$, and an angle of the upper seat back relative to the Z-axis ($\alpha'$) to determine a compound angle ($\varphi$) between the torso line and the femoral line of the occupant seated in the seat and thereby characterize the posture state of the occupant seated in the seat.

10. A vehicle occupant posture detection (OPD) method, comprising the steps of:
    determining an angle ($\alpha$) between a Z-axis and a torso line of an occupant seated in a seat of a vehicle using a measuring device coupled to a seat back of the seat;
    determining an angle ($\beta$) between the Z-axis and a femoral line of the occupant seated in the seat using a measuring device coupled to a seat bottom of the seat; and
    using the determined values of $\alpha$ and $\beta$ to determine an angle ($\varphi$) between the torso line and the femoral line of the occupant seated in the seat and thereby characterize a posture state of the occupant seated in the seat.

11. The method of claim 10, wherein using the determined values of $\alpha$ and $\beta$ to determine $\varphi$ between the torso line and the femoral line of the occupant seated in the seat and thereby characterize the posture state of the occupant seated in the seat further comprises using the determined values of $\alpha$, $\beta$ and an angle of the vehicle relative to a ground plane to determine an oriented angle ($\varphi$) between the torso line and the femoral line of the occupant seated in the seat and thereby characterize the posture state of the occupant seated in the seat.

12. The method of claim 10, further comprising moving the seat to a preferred posture configuration based on the determined value of one or more of $\alpha$, $\beta$, $\varphi$, a sensed relative seat position, a sensed relative seat configuration, a sensed vehicle speed, and a safety restraint configuration.

13. The method of claim 10, further comprising limiting the seat to a preferred posture configuration range of adjustment based on the determined value of one or more of $\alpha$, $\beta$, $\varphi$, a sensed relative seat position, a sensed relative seat configuration, a sensed vehicle speed, and a safety restraint configuration.

14. The method of claim 10, further comprising suggesting a preferred posture configuration for the seat based on the determined value of one or more of $\alpha$, $\beta$, $\varphi$, a sensed relative seat position, a sensed relative seat configuration, a sensed vehicle speed, and a safety restraint configuration.

15. The method of claim 10, further comprising alerting the occupant to whether the seat is in a preferred or disfavored posture configuration for the seat based on the determined value of one or more of $\alpha$, $\beta$, $\varphi$, a sensed relative seat position, a sensed relative seat configuration, a sensed vehicle speed, and a safety restraint configuration.

16. The method of claim 10, further comprising moving the seat to a preferred posture configuration based on the determined value of one or more of α, β, φ, a sensed relative seat position, a sensed relative seat configuration, a sensed vehicle speed, and a safety restraint configuration in the event that an impending impact event is detected.

17. The method of claim 10, further comprising using the measured value of a to determine a height of a head rest of the seat.

18. The method of claim 10, where the seat back includes a lower seat back and an upper seat back that are configured to pivot with respect to one another, and wherein using the determined values of α and β to determine φ between the torso line and the femoral line of the occupant seated in the seat and thereby characterize the posture state of the occupant seated in the seat further comprises using the determined values of α, β, and an angle of the upper seat back relative to the Z-axis (α') to determine a compound angle (φ) between the torso line and the femoral line of the occupant seated in the seat and thereby characterize the posture state of the occupant seated in the seat.

19. A non-transitory computer-readable medium storing computer-executable instructions configured to a vehicle occupant posture state, the computer-executable instructions being configured to cause the following computer-executed steps to occur:

determining an angle (α) between a Z-axis and a torso line of an occupant seated in a seat of a vehicle using a measuring device coupled to a seat back of the seat;

determining an angle (β) between the Z-axis and a femoral line of the occupant seated in the seat using a measuring device coupled to a seat bottom of the seat; and using the determined values of α and β to determine an angle (φ) between the torso line and the femoral line of the occupant seated in the seat and thereby characterize a posture state of the occupant seated in the seat.

20. The non-transitory computer-readable medium of claim 19, wherein the step of using the determined values of α and β to determine φ between the torso line and the femoral line of the occupant seated in the seat and thereby characterize the posture state of the occupant seated in the seat further comprises using the determined values of α, β and an angle of the vehicle relative to a ground plane to determine an oriented angle (φ) between the torso line and the femoral line of the occupant seated in the seat and thereby characterize the posture state of the occupant seated in the seat.

21. The non-transitory computer-readable medium of claim 19, where the seat back includes a lower seat back and an upper seat back that are configured to pivot with respect to one another, and wherein the step of using the determined values of α and β to determine φ between the torso line and the femoral line of the occupant seated in the seat and thereby characterize the posture state of the occupant seated in the seat further comprises using the determined values of α, β, and an angle of the upper seat back relative to the Z-axis (α') to determine a compound angle (φ) between the torso line and the femoral line of the occupant seated in the seat and thereby characterize the posture state of the occupant seated in the seat.

* * * * *